United States Patent [19]

Heynisch

[11] 3,852,635

[45] Dec. 3, 1974

[54] TRANSIT-TIME AMPLIFIER TUBE WITH STABILIZED DELAY

[75] Inventor: Hinrich Heynisch, Graefelfing, Germany

[73] Assignee: Siemens Aktiengesellshaft, Berlin & Munich, Germany

[22] Filed: July 6, 1973

[21] Appl. No.: 377,017

[30] Foreign Application Priority Data

July 31, 1972 Germany 2237694

[52] U.S. Cl. 315/3.5, 315/36, 330/43

[51] Int. Cl. H01j 25/34

[58] Field of Search 315/3.5, 3.6; 330/43

[56] References Cited

UNITED STATES PATENTS

| | | | |
|---|---|---|---|
| 3,336,496 | 8/1967 | Blinn | 315/3.6 |
| 3,360,679 | 12/1967 | Rubert | 315/3.5 |
| 3,510,720 | 5/1970 | Putz | 315/3.5 |
| 3,538,377 | 11/1970 | Slocum | 315/3.6 |

*Primary Examiner*—James W. Lawrence
*Assistant Examiner*—Saxfield Chatmon, Jr.
*Attorney, Agent, or Firm*—Hill, Gross, Simpson, Van Santen, Steadman, Chiara & Simpson

[57] ABSTRACT

A transit-time amplifier tube with a delay line arranged between an input wave guide and an output wave guide and with adjustable wave reflectors for adjusting the frequency-dependent gain employs wave reflecting or smoothing elements arranged in the input wave guide and/or output wave guide and outside of the delay line. The amplifier tube also utilizes an attenuating section in the course of the delay line which has attenuation material displaced in the peripheral direction of the delay line and/or distributed in the form of sections of different mean attenuations.

18 Claims, 2 Drawing Figures

TRANSIT-TIME AMPLIFIER TUBE WITH STABILIZED DELAY

BACKGROUND OF THE INVENTION

1. Field of the Invention

This invention relates to a transit-time amplifier tube, and more particularly to such a tube which has a delay line arranged between an input wave guide and an output wave guide and adjustable wave reflectors for stablizing the frequency-dependent gain of the tube.

2. Description of the Prior Art

Reflections at junctions in the field-filled space of a transit-time tube produces an undulation in the curves of gain and group velocity as a function of frequency. The undulation, as those skilled in the art will recognize, is responsible for a frequency-dependent phase distortion. Phase distortion of this kind manifest itself, for example, in the garbling of signals when the tube is used in a frequency modulation mode in radio relay work, or in so-called cross-talk when the pass band of the tube must accommodate several carrier frequencies. In order to attenuate these reflections, it is already known from the German application DOS No. 1,919,167 in the context of a transit-time amplifier tube of normal dispersion characteristic to partially suppress a backward wave by means of a wave reflecting discontinuity at the electron beam generating end of the delay line. In this context, the discontinuity must be located in the interaction space of the tube and is introduced into the delay line. In very fine delay lines this kind of measure results in a very considerable manufacturing cost, if it is capable of being implemented at all.

SUMMARY OF THE INVENTION

The object of the present invention, considering a transit-time amplifier tube, is to reduce the frequency-dependent undulation ripple in the delay using wave reflecting means in such a fashion that the aforementioned restrictions are overcome.

To realize the foregoing object in the context of transit-time amplifier tubes of the type initially described, it is proposed in accordance with the present invention that the smoothing elements be arranged in the neighborhood of the input wave guide and/or output wave guide and outside of the delay line.

The present invention starts from the premise that the reflected parasitic wave need not first of all be reduced by a further reverse reflection carried out in a certain manner, but can equally well be suppressed by a co-directional, additional reflection of the primary wave, provided that suitable phase relationships are present between the two reflected waves. With this kind of interference mechanism, it is not necessary to introduce the additional discontinuity into the delay line. The method proposed in accordance with the present invention is applicable to all types of delay lines, irrespective of a possible mechanically extremely fine structure. Moreover, all of the unwanted electrical effects which are contingent upon an anisotropic disturbance in the interaction space are avoided.

In the case of a transit-time amplifier tube in accordance with the invention and having an attenuation section in the course of the delay line, it is provided that the attenuation material of the attenuation section be displaced in the peripheral direction of the delay line and/or be arranged in the form of sections having different mean attenuations. As those skilled in the art will realize, the attenuation section likewise represents a reflective junction vis-a-vis electromagnetic waves and because of this the reflection reducing precautions in the attenuation sections in a transit-time amplifier tube reinforce the smoothing effect in a cumulative way according to this invention.

In accordance with a further development of the invention, it is proposed, considering a transit-time amplifier tube, that the smoothing elements be displaceable longitudinally and transversely in relation to the direction of propagation of the electromagnetic waves. This type of additional measure is particularly suitable where the tube is operated alternately in different frequency ranges. The facility for displacement of the smoothing elements makes it possible in this context to arrange for the optimum smoothing effect achieved to be located in each case in the operating ranges, say at a carrier frequency. It is sufficient here simply to arrange for the smoothing effect to be as wide as the widest of the various frequency ranges. The smoothing elements can quite simply be displaced during operation of the tube because they are located in zones outside of the delay line. A particularly wide band smoothing effect can be achieved if the smoothing elements are arranged in the direction of propagation of the high frequency waves, at an interval from the delay line corresponding to a quarter of the mean operating wave length.

BRIEF DESCRIPTION OF THE DRAWING

Other objects, features and advantages of the invention its organization, construction and operation in the context of a traveling wave tube with a delay line in the form of coupled cavity resonators will be best understood from the following description taken in conjunction with the accompanying drawing, on which.

DESCRIPTION OF THE PREFERRED EMBODIMENT

Figure 1:
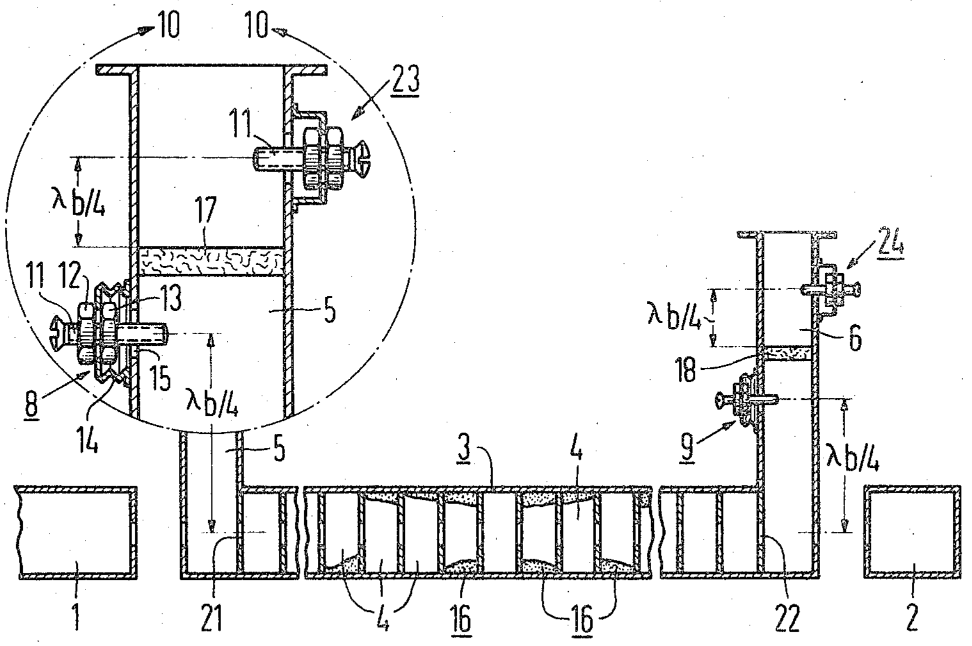
FIG. 1 is a schematic diagram, shown in a sectional elevation, of a transit-time or traveling wave amplifier tube constructed in accordance with the principles of the present invention.

Referring to FIG. 1, an electron beam generating system 1 and an electron beam catcher, or collector 2 have a delay line 3 therebetween. The delay line 3 comprises coupled cavity resonators 4, these resonators being purely schematically illustrated on the drawing. The high frequency signal for amplification is injected through a wave guide, in this case a wave guide 5, into the delay line 3, there amplified in the normal manner, and fed out through a wave guide, in this case a wave guide 6. In signal transmission, in the course of wave propagation, reflections occur at all those points constituting junctions as far as electromagnetic waves are concerned. An input 21 and an output 22 of the delay line 3, in particular, represent reflective discontinuities which produce sudden shifts in the phase velocity of the signal waves. To reduce the parasitic waves produced at such discontinuities by reflection, wave reflecting media (smoothing elements) are provided in accordance with the invention wherein a smoothing element 8 is arranged at the input wave guide 5 and a smoothing element 9 is arranged at the output wave guide 6, in each case outside of the delay line 3. The interval of the smoothing elements 8, 9 from the input 21 and the output 22, respectively, of the delay line 3, is designed in each case that in the neighborhood of the operating frequencies destructive interference phenomena occur with respect to the wave components in each case reflected at the input reflector pair, consisting of the input 21 and the smoothing element 8, and the output reflective pair, consisting of the output 22 and the smoothing element 9. In order to make this cancellation effect as wide band in nature as possible, the reflectors of a pair should be spaced apart by a distance of about a quarter of the mean operating wave length $\lambda_b$ in the direction of the propagation of the waves. These distances have been marked accordingly in the input and output wave guides in FIG. 1.

In the illustrated example, the smoothing elements are designed to be adjustable. Their precise design can be seen from the enlargement of the corresponding input wave guide section which is circled by a chain dotted circle 10. A smoothing element in this case consist of a plunger 11 with a thread which is secured by two lock nuts 12, 13 in a flexible bellows 14 of metal, for example, and guided by a lengthwise slot 15 in the wave guide wall. The plunger 11 is therefore positionable transversely and longitudinally in relation to the direction of the propagation of the waves, and therefore enables the tuning of the smoothing effect. Instead of plungers, of course, loops or some other frame-like discontinuity can be used as smoothing elements if, under certain circumstances, instead of a capacitive character, the power loads are to have an inductive or resonance character, in order to make the smoothing action more effective. The entire mounting for the smoothing elements must be vacuum-tight. In order to overcome the problem of providing a vacuum-tight structure, a smoothing element in accordance with the invention can also be constructed simply of a magnetizable material and be guided from outside of the wave guide in a contactless fashion by magnetic forces, for example by means of a magnetic ring embracing the wave guide.

Junction locations for the electromagnetic waves are constituted not merely by the input 21 and the output 22 of the delay line 3, but also, possibly, by an attenuation section arranged in the course of the delay line, as indicated by the dotted area 16 in the drawing, and by microwave windows in the input and output wave guides, indicated at 17 and 18, respectively, in FIG. 1.

In order to reduce reflections at the attenuation section 16, it is advantageous to arrange for the attenuation material of this section to be displaced in the peripheral direction of the delay line and/or distributed in the form of sections of different mean attenuations, as indicated in the drawing by the cross-patched areas. The gain ripple is cumulatively reduced with this kind of design of the attenuating section, in association with the smoothing elements provided as indicated above.

To avoid unwanted reflections at the microwave windows, additional smoothing elements can be arranged before the microwave window 17 and the input wave guide and after the microwave window 18 and the output wave guide, i.e., outside the space which is closed off in a vacuum-tight fashion by the microwave windows. In FIG. 1 these additional smoothing elements are referenced 23 and 24 and are of the same character as discussed above with respect to the smoothing elements 8, 9.

Figure 2:
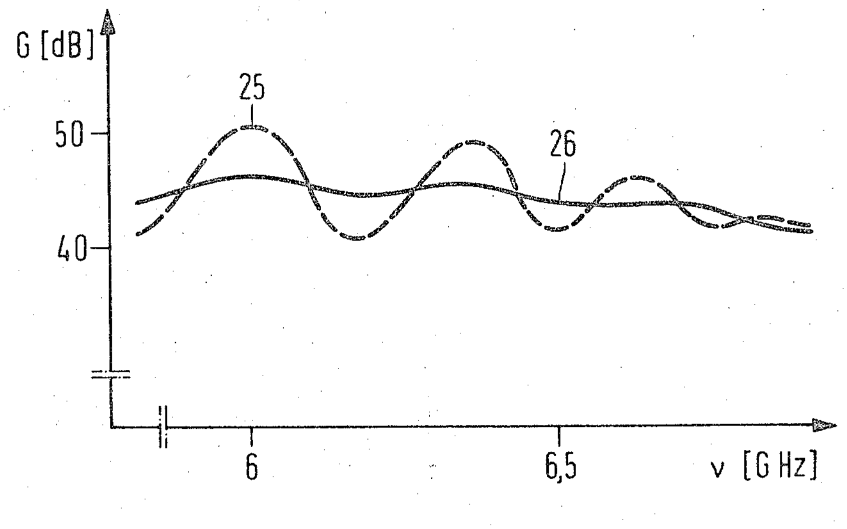
FIG. 2 is a graph illustrating a plot of gain in dB with respect to operating frequency in gigahertz (GHz).

In the graphic illustration of FIG. 2 the gain G in dB, has been plotted against the operating frequency of a transit-time amplifier tube, measured in gigacycles (GHz). The operating frequency band of this tube is between 6 and 6.5 GHz. The figure illustrates how the ripple in the gain of the tube (curve 25) is drastically reduced (curve 26) by the wave reflecting means proposed in accordance with the present invention The invention is not limited to the illustrated example; a transit-time amplifier tube in accordance with the invention need not in fact be constitued by the traveling wave tube and the delay line need not be constituted by coupled cavity resonators.

Many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A transit-time amplifier tube comprising an input wave guide, an output wave guide, a delay line coupled between said input wave guide and said output wave guide and at least one adjustable wave reflector arranged outside of said delay line for adjusting the frequency-dependent gain, said wave reflector positioned in one of said wave guides outside of said delay line.

2. A transit-time amplifier tube according to claim 1, wherein said wave reflector is disposed at an interval corresponding to a quarter of the mean operating wave length from the delay line in the direction of propagation of the waves.

3. A transit-time amplifier tube according to claim 1, wherein said delay line includes an attenuating section, said attenuating section including attenuation material which is displaced in the peripheral direction of the delay line.

4. A transit-time amplifier tube according to claim 3, wherein the attenuation material is distributed in the form of sections of different mean attenuations.

5. A transit-time amplifier tube according to claim 1, wherein the said at least one reflector is adjustable longitudinally and transversely in relation to the direction of propagation of the electromagnetic waves.

6. A transit-time amplifier tube according to claim 1, wherein said adjustable wave reflector is mounted in said input wave guide.

7. A transit-time amplifier tube according to claim 1 wherein said adjustable wave reflector is mounted in said output wave guide.

8. A transit-time amplifier tube according to claim 1, comprising two adjustable wave reflectors respectively mounted in said input wave guide and said output wave guide.

9. A transit-time amplifier tube according to claim 1, wherein said adjustable wave reflector includes a plunger extending through the wall of said one wave guide and adjustable from outside of the wave guide.

10. A transit-time amplifier tube according to claim 1 comprising a first microwave window closing said input wave guide in a vacuum-tight manner and a second microwave window closing said output wave guide in a vacuum-tight manner.

11. A transit-time amplifier tube according to claim 10 comprising additional adjustable wave reflectors mounted in said input and output wave guides outside of the space closed off in a vacuum-tight manner.

12. A transit-time amplifier tube according to claim 11 wherein said additional adjustable wave reflectors are disposed a quarter of the mean operating wave length from the respective microwave window.

13. A transit-time amplifier tube comprising an input wave guide, an output wave guide, a delay line coupled between said input wave guide and said output wave guide, first and second microwave windows closing the respective input and output wave guides in a vacuum-tight manner, and a plurality of adjustable wave reflectors for adjusting the frequency-dependent gain, a first of said reflectors mounted in said input wave guide within the vacuum-tight space, a second of said reflectors mounted in said output wave guide within said vacuum-tight space, a third of said reflectors mounted in said input wave guide outside of said vacuum-tight space, and a fourth of said reflectors mounted in said output wave guide outside of said vacuum-tight space, said first and second reflectors disposed at an interval from the delay line corresponding to a quarter of the mean operating wave length and said third and fourth reflectors disposed at an interval with respect to the respective microwave windows corresponding to a quarter of the mean operating wave length.

14. A transit-time amplifier tube according to claim 13 wherein said reflectors are adjustable transversely and longitudinally of the respective wave guides with respect to the direction of wave propagation.

15. A transit-time amplifier tube according to claim 13 wherein said first and second adjustable wave reflectors extend through the wall of the respective wave guide in a vacuum-tight manner and are adjustable from outside of the respective wave guide.

16. A transit-time amplifier tube according to claim 15 wherein said first and second adjustable wave reflectors are mounted in respective metal bellows.

17. A transit-time amplifier tube according to claim 13 comprising an attenuating section within said delay line, said attenuating section including attenuating material displaced in the peripheral direction of the delay line.

18. A transit-time amplifier tube according to claim 13 comprising an attenuating section in said delay line, said attenuating section including attenuation material distributed in the form of sections of different mean attenuations.

* * * * *